United States Patent [19]

Manson et al.

[11] Patent Number: 5,100,053
[45] Date of Patent: Mar. 31, 1992

[54] AUTOMATIC SET-BACK TEMPERATURE CONTROL FOR AIR CONDITIONERS AND THE LIKE

[75] Inventors: Larry J. Manson, Baroda Township, Berrien County; John K. Paustian, Benton Township, Berrien County, both of Mich.

[73] Assignee: Whirlpool Corporation, Benton Harbor, Mich.

[21] Appl. No.: 539,801

[22] Filed: Jun. 18, 1990

[51] Int. Cl.[5] .......................... G05D 23/00; H01J 3/14
[52] U.S. Cl. ....................................... 236/47; 250/216
[58] Field of Search ................. 236/46 R, 47; 165/12; 62/202; 250/216, 214 AL

[56] References Cited

U.S. PATENT DOCUMENTS

| | | | |
|---|---|---|---|
| 2,912,593 | 11/1959 | Deuth | 250/216 X |
| 3,352,490 | 11/1967 | Dalzell et al. | 236/68 B |
| 3,974,426 | 8/1976 | Gingras | 236/47 X |
| 4,014,500 | 3/1977 | Galtz | 236/68 B |
| 4,032,069 | 6/1977 | Cannella | 236/68 B |
| 4,188,604 | 2/1980 | Maybee | 236/68 B |
| 4,485,864 | 12/1984 | Carrell et al. | 236/47 |
| 4,502,290 | 3/1985 | Suzuki et al. | 236/47 X |
| 5,022,725 | 6/1991 | Natsunami | 250/216 X |

Primary Examiner—William E. Wayner
Attorney, Agent, or Firm—Price, Heneveld, Cooper, DeWitt & Litton

[57] ABSTRACT

A control system for automatically changing the operational mode of appliances and the like, particularly environmental-affective appliances such as air conditioners, and in particular room air conditioners, as a function of the activity level prevalent in the environment being served, wherein the environmental activity level is monitored by detecting the level of ambient light and the detected light level is used to produce a signal for changing the previously-set operational parameter, e.g., room temperature. In a preferred embodiment, a lens system is utilized for focusing ambient light received at a detecting port upon a photodetector which is spaced from such port, and the resulting electrical signal is utilized in a circuit to control a heater mounted adjacent the appliance control, e.g., the air conditioner thermostat, to thereby vary the set-point in accordance with a predetermined relationship. In the preferred embodiment, the control circuit embodies a signal lamp or the like for indicating the active state of the control circuit, thereby signaling that set-point change is taking place.

5 Claims, 2 Drawing Sheets

AUTOMATIC SET-BACK TEMPERATURE CONTROL FOR AIR CONDITIONERS AND THE LIKE

FIELD OF THE INVENTION

This invention relates generally to control systems for appliances and the like, and more particularly to control systems for environment-affective appliances and devices such as air conditioners (which may, broadly considered, be either heating or cooling devices). More particularly still, the invention relates to automatically-operating control systems for such applications, by which a predetermined change in standard or previously-set operating conditions occur automatically in response to subsequent changes in the environment being served, in particular, changes in the level of activity prevalent within the particular environment being served, as determined for example by the relative prevalence of activity-indicative parameters such as illumination within such area. In a particular embodiment disclosed to aptly illustrate an actual application of the invention, an automatic set-back system for room air conditioners is disclosed which monitors and operates in response to the relative amount of ambient light present within the area being served.

PREVIOUS DEVELOPMENTS AND EFFORTS

Various enhancements have been devised in the past for automatically interacting with the control systems of appliances in order to modify their pre-set mode of operation in response to the detected occurrence of various potential conditions or circumstances, safety shut-down systems or devices being a broadly generalized example. In appliances of the type which condition the human environment, e.g., air conditioners and the like, thermostats are typically used to maintain the prevailing temperatures in a given area within a predetermined range, and various different "set back" devices have been provided heretofore by which the thermostat trip point selected for normally-expected daytime or work week conditions is automatically set back or otherwise varied during other times.

Basically, practically all of the previous devices of the type just noted are based upon the detected passage of time, i.e., they are triggered by a timer as various intervals elapse. Of course, such systems are strictly time-based, and do not monitor actual conditions existing within the area being served; consequently, they may or may not discontinue the normal heating or cooling activity at times when the comfort of the occupants or working conditions of the environment are in fact best served. In addition, such systems are typically dependent upon timing devices energized from line voltage, and thus may vary undesirably in response to power outages and the like, if they do not include appropriate battery back-up systems which add further expense and which are prone to various causes of malfunction including the inadvertent failure to provide fresh batteries as necessary.

OVERVIEW AND SUMMARY OF INVENTION

The present invention has for its major objectives and advantages the provision of apparatus based upon a new and novel concept for initiating control of environmentally affective appliances, such as air conditioners and the like, as a function of actual conditions prevalent within the affected area, without recourse to the passage of time and independent of the particular time of day. More particularly, the present invention provides such a control apparatus and corresponding system for utilizing same by which a set-back or similar variation in a previously-established mode of operation is obtained as a function of the activity level present within the area served, such that set-back or suspension of normal operating conditions is automatically implemented in response to the existence of predetermined levels of comparative inactivity, regardless of the time of day at which such periods may occur.

In a particular preferred example of the invention, the prevailing activity level is determined by monitoring the relative amount of ambient light, such that the previously-set and normal activity, such as heating or cooling, occurs at night after artificial lighting has been switched off. In other and broader embodiments, as aspects of the underlying invention, prevailing activity levels may be monitored in other ways, such as for example the use of known forms of motion-detectors and/or proximity-sensing devices, for example, infrared, radar, or reactance sensors, as well as sensing and detecting apparatus of the type used in area surveillance systems.

In a specific example of the invention, disclosed hereinafter as a preferred embodiment, a room air conditioner is equipped with a manually-actuatable thermostat control, and a light-sensing system is utilized to vary the selected set-point of the thermostat in response to the presence of diminished environmental light, such that the set-point is effectively raised when the amount of environmental light decreases to a predetermined degree, indicating decreased levels of activity in the area.

The foregoing major objectives and advantages of the invention, together with its underlying concepts, will become more apparent after consideration of the ensuing detailed description of preferred embodiments and accompanying drawings thereof.

BRIEF DESCRIPTION OF THE DRAWINGS

In the accompanying drawings.

DESCRIPTION OF THE PREFERRED EMBODIMENT

Figure 1:
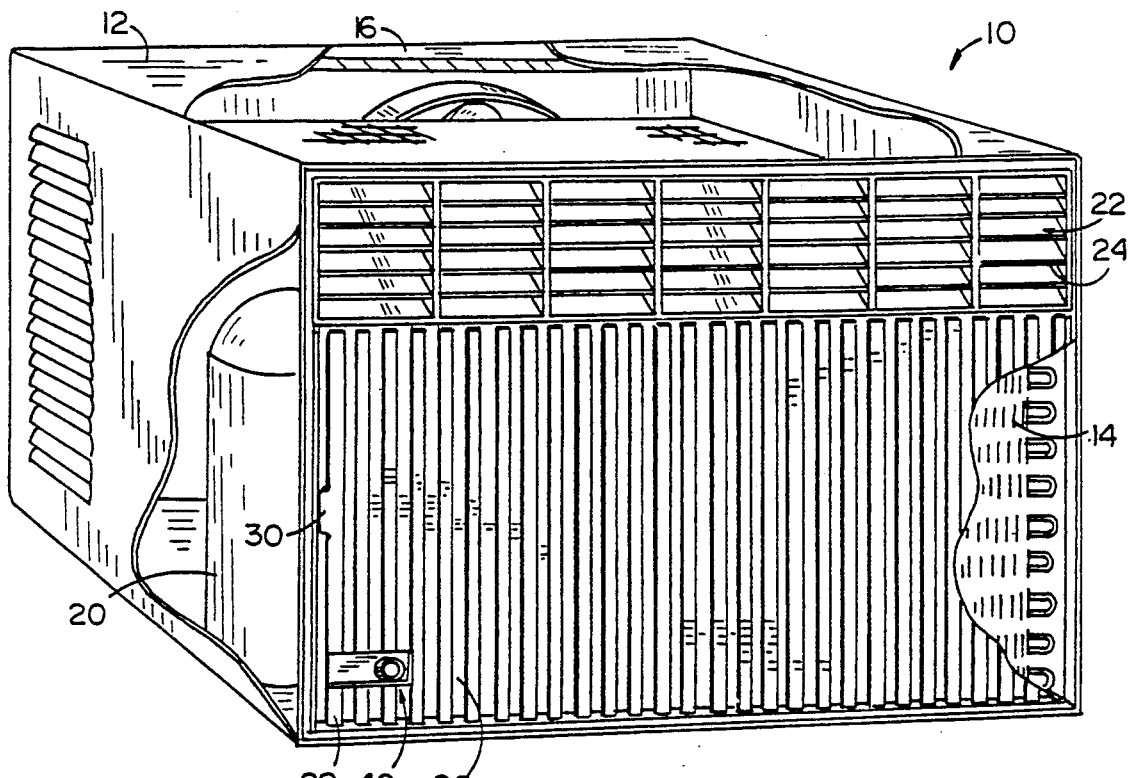
FIG. 1 is a frontal perspective view of a typical room air conditioner in connection with which a preferred embodiment of the invention is disclosed.

Referring now in more detail to the drawings, FIG. 1 depicts a room air conditioning apparatus 10 of a generally known type, in which the present invention is advantageously useful and in which it has been incorporated. As generally illustrated in FIG. 1, the air conditioning device 10 includes an outer cabinet 12 of a generally rectangular shape which houses the various components which make the device operate for the intended purpose. Thus, the cabinet 12 includes within it an evaporator 14, a condenser 16 having an adjacent motor driven blower 18, a compressor 20, and other such components whose nature and interconnection is well known in the art, as shown for example in prior U.S. Pat. Nos. 3,158,005 and 4,109,482, which are commonly-owned herewith and which are incorporated by reference for their more particular description of the cooling system generally and its control elements and circuitry.

As further illustrated in FIG. 1, and as also noted in the two mentioned previous patents, the room air conditioner 10 generally includes a decorative and functional front panel 22 having a series of louvers 24 at the top (and/or elsewhere, as desired) which are preferably movable in a manner to adjust and direct a flow of cool air outwardly into desired areas of the adjacent room, so as to cool such areas. The front panel 22 also includes a large area covered by fixed louvers or other such openwork, through which air may be drawn inwardly to pass through the evaporator 14 so as to be cooled before being expelled outwardly through the upper louvers 24 (the evaporator having a motor-driven blower or fan disposed immediately behind it, which is not specifically illustrated).

Figure 2:
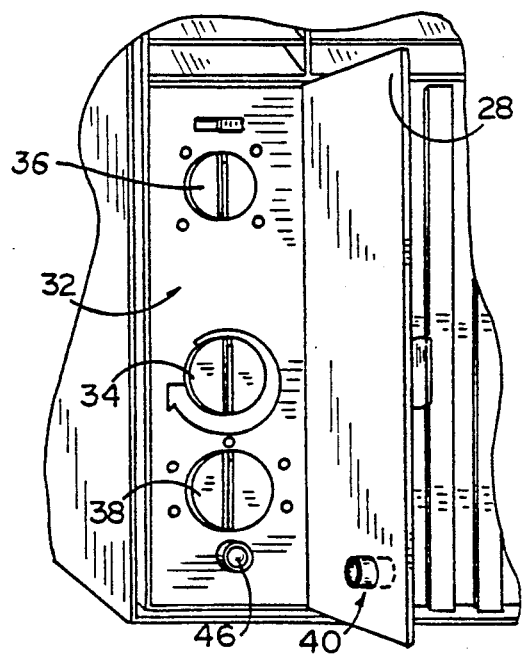
FIG. 2 is an enlarged, fragmentary, front-elevational view of the control panel for a room air conditioner of the type shown in FIG. 1.

The front panel 22 further includes a control panel access door 28, which in this example is disposed along the left-hand edge of the front panel. Preferably, door 28 has an operating tab or handle 30 by which the door may conveniently be manually opened by hinging along a vertical axis (FIG. 2), so as to afford access to a control panel 32 disposed behind the door 28. As illustrated, control panel 32 is basically of a conventional nature for apparatus of this type, and mounts the operating controls for the air conditioning unit. Thus, control panel 32 typically includes an adjustable thermostat control having a manually-operable handle or knob 34, together with such other controls as an air select control 36 by which the operator may choose between air supply options such as intake, exhaust, recycle, etc., and a fan speed and mode select control 38, by which the operator may select from between such operational modes as fan only, fan plus cooling, high speed, low speed, etc. The air-select control 36 is not actually involved in the present invention, and is thus not shown in the other figures.

Figures 3, 4:
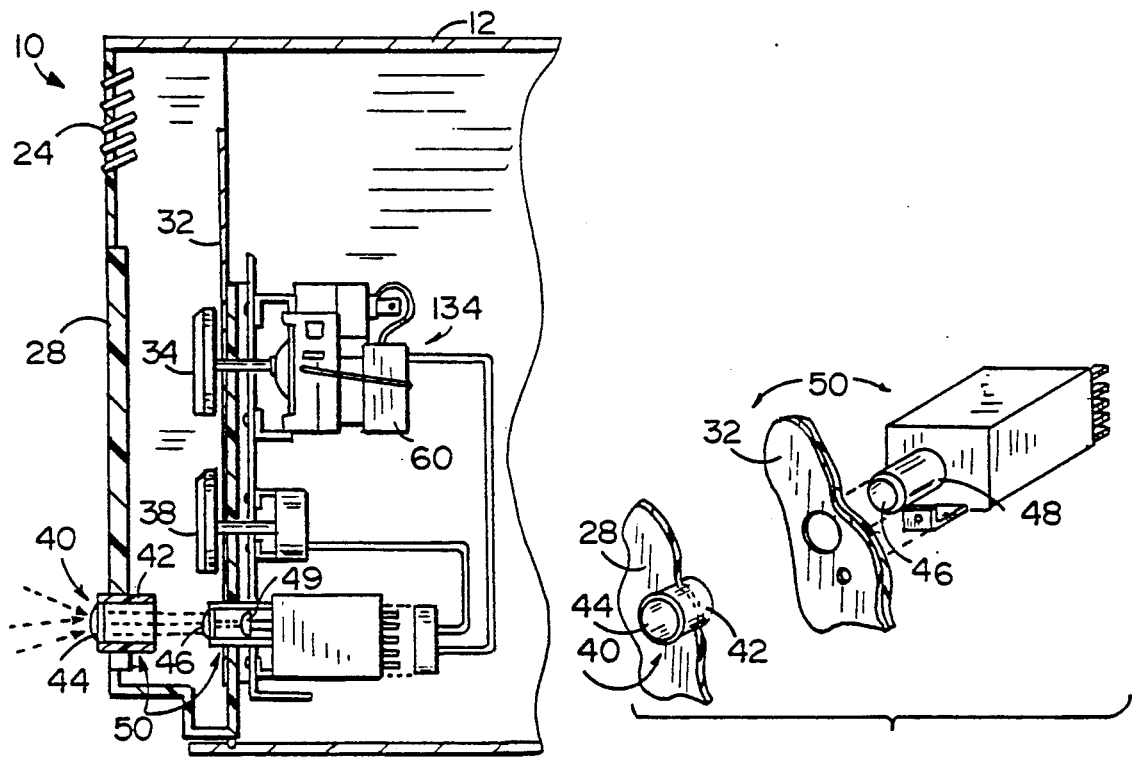
FIG. 3 is a fragmentary, pictorial, side-elevational view depicting a system in accordance with the invention installed upon an air conditioner of the type shown in FIG. 1.
FIG. 4 is an enlarged, exploded, perspective view showing a portion of the system shown in FIG. 3.

In accordance with the present invention, the air-conditioner unit 10 also includes an external condition-monitoring port 40 (FIGS. 1, 2, 3 and 4), which constitutes a light-collecting and light-admitting lens system in the particular embodiment illustrated and described herein. More particularly, in the particular embodiment here described, the monitoring port 40 is mounted in access door 28 and includes a tubular housing 42 mounted within a corresponding aperture in such door. Housing 42 has a lens 44 mounted in its outer end (FIG. 3) which is preferably convex on the outermost side and planar on the inner side facing the interior of housing 42. Another such lens 46 is disposed at the outer end of the projecting tubular inlet 48 of a light-detector which includes a photocell 49 (or other such light-sensing device) upon which the lenses 44 and 46 collect and focus ambient light. As a specific example of particular parameters for the lenses 44 and 46 (which are technically optional in the implementation of the invention), it has been found that good results are achieved by using eleven mm-diameter circular plano-convex lenses with a −43 mm focal length, particularly where the distance between the mounting panel 32 and door 28 is on the order of approximately one inch and photocell 49 is the commercially available device identified as a C67537B, and the convex side of lens 46 faces the plano side of lens 44 and the plano side of lens 46 faces the photocell 49.

With such an arrangement, the monitoring port 40 maintains wide-angled surveillance over the interior of the room served by air conditioner unit 10, collecting ambient light with lens 44 and thereby monitoring activity levels within the room. The collected light is emitted rearwardly through the plano surface of lens 44 and focused onto the convex surface of lens 46, which in turn focuses the light on the adjacent photocell or other such optical detector 49 mounted at the bottom of control panel 32, beneath the mode-select control 38. Thus, the monitoring port 40 is optically coupled to the detector 49 whenever the access door 28 is in its normally-closed position, such as is typically true during operation of the air conditioner 10; at the same time, the access door 28 may be opened as desired in order to select different operating conditions by use of the controls provided therewithin, and the unit may be operated with the access door 28 open, since the ambient light will then fall directly on lens 46 and be directed onto the adjacent photocell. Further, the entire front panel 22 may be removed to clean the evaporator 14 or perform other such maintenance without affecting the monitoring port 40 and its various components.

It should be noted that monitoring port 40 and detector 49 together comprise an optical sensing and control unit 50 which is considered representative of various ways of monitoring the activity level within the room served by the air conditioner 10, in that activity level is evidenced by the relative amount of illumination or light present within the adjacent space, as described more fully below. In accordance with the broader aspects of the invention, it should be borne in mind that such activity level-monitoring may be carried out by other means, depending upon the parameters selected as being representative of the particular activity to be monitored. Thus, for example, in accordance with the preferred embodiment, the presence of human activity is assumed evidenced by the presence of illumination, which harmonizes directly with the likely correlation between the presence of sunlight and solar heating effects within the room. Other monitoring means could be analogously selected, however, such as for example, motion detectors of known types (e.g., infrared, ultrasonic, radar field, etc.), as well as, or in addition to, such other potential activity-monitoring apparatus as audio sensors, proximity sensors and the like, whose use and operation in the present system will be understood more fully after consideration of the following more particular description of the preferred embodiment noted.

Figure 5:
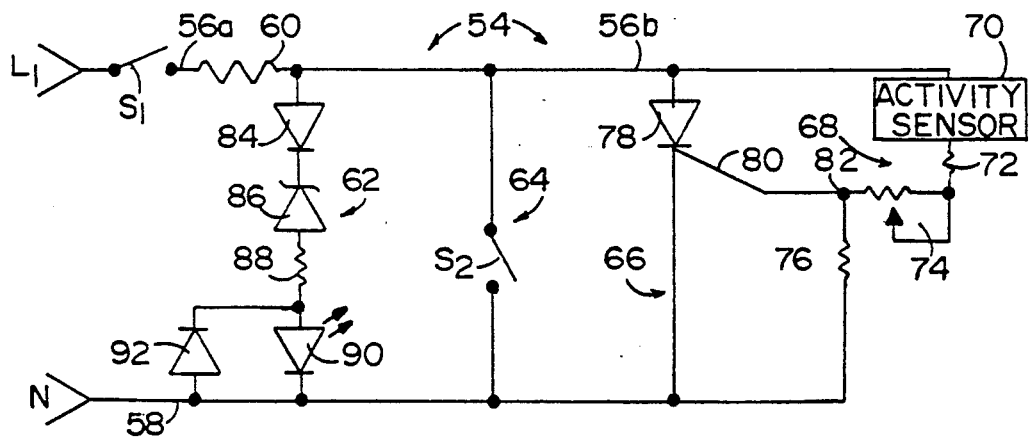
FIG. 5 is a schematic circuit diagram showing a form of the control system in accordance herewith.
Figure 6:
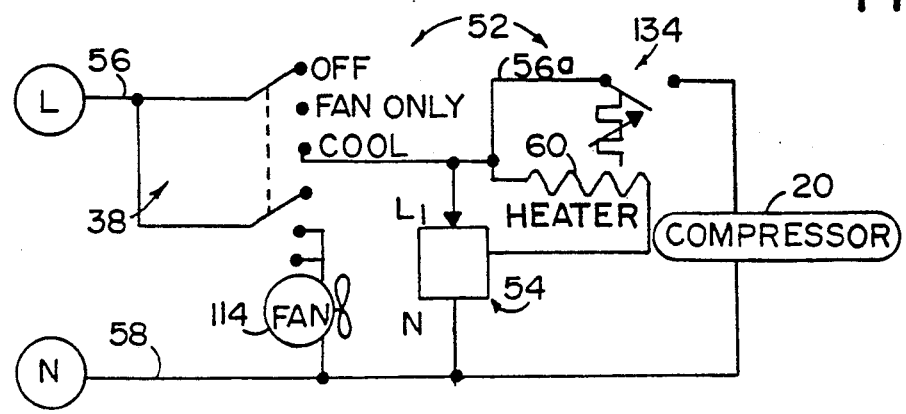
FIG. 6 is a schematic circuit diagram showing a typical operating circuit for an air conditioner of the type hereinvolved.

FIG. 6 illustrates the basic nature of an operating circuit 52 for the air conditioning unit 10, in conjunction with which the optical activity-monitoring apparatus and related control circuit 54, illustrated in FIG. 5, is utilized and into which it is, in effect, integrated. In the operating circuit 52 of FIG. 6, standard line voltage is provided on a conductor 56 and is selectively applied by mode select switch 38 to the compressor 20 and evaporator fan 114, which are connected between line conductor 56 and the system neutral conductor 58. The general operation of the mode-select switch 38 is familiar to those skilled in the art and will be readily apparent upon consideration, being described and discussed in further detail in the aforementioned prior patents which are incorporated herein by reference. It will be noted, however, that the operating circuit 52 illustrated in FIG. 6 additionally includes a thermostatic control unit 134 connected into a portion of the line voltage conductor 56a located between the mode-select switch 38 and compressor 20. Also, operating circuit 52 includes an activity-monitoring control circuit and apparatus 54 of the type referred to above, which may comprise the optical detector 50 described above in a preferred embodiment of the invention, connected to the line voltage side of the circuit at the branch controlled by switch 38 which is labelled "cool". Thus, the line voltage present on conductor 56 is also present on branch conductor 56a, and serves as the input line voltage $L_1$ applied to control apparatus 54. As illustrated, the system common or neutral conductor 58 is connected on the other side of control apparatus 54, at point N.

Referring now more particularly to the control circuit apparatus 54 illustrated in FIG. 5, line voltage on conductor 56a may be applied through an optional on-off switch $S_1$ to a resistance heater element 60 and along a supply line 56b, across which are connected a number of parallel branches 62, 64, 66 and 68, in the latter of which the component 70 labeled "Activity Sensor" may comprise the optical sensing and control unit 50 discussed above in conjunction with FIGS. 3 and 4. As illustrated, the activity sensor 70 is preferably coupled to the circuit neutral conductor 58 through a limiting resistor 72, a set-back-point adjustment potentiometer 74, and a bleed-off resistor 76 whose resistance value is large in relation to that of resistor 72. Circuit branch 66 includes a switch 78, i.e., in this particular embodiment an SCR (e.g., the commercially available device designated S2600B), whose control electrode or gate 80 is connected to the junction point 82 between potentiometer 74 and resistor 76. Parallel circuit branch 64 of circuit 54 merely includes a manually-controllable override switch $S_2$ whose function and purpose are made more clear subsequently.

Parallel circuit branch 62 of the control circuit includes a first series-connected diode 84, a Zener diode 86, and a limiting resistor 88, whose resistance preferably is on the same order as that of resistor 76 in circuit branch 68. The low-potential side of resistor 88 is coupled to an LED signalling diode 90 shunted by a reverse-voltage protection diode 92, connected in opposite polarity. As discussed further in the ensuing paragraphs, the basic purpose of signal LED 90 is to indicate the onset and ongoing presence of thermostat set-back operation, which in this embodiment is caused by a change in the level of current flow through heater resistor 60 caused by the operation of the activity sensor 70 in response to diminished environmental activity. Basically, this reduced current flow causes the heater 60 to produce insufficient heat to materially change the set-point of thermostat 34, resulting in the effective increase of the preselected set-point.

More particularly, where the activity sensor 70 comprises a photocell or the like, as in the preferred embodiment referred to previously, typical operation during daylight periods is deemed to represent a comparatively high activity level. Such elevated levels of light result in lowered resistance of the conductive path through photocell 48, producing a comparatively high potential at circuit point 82 and triggering SCR 78 into conduction. This causes the resistance of branch 66 to be low, resulting in comparatively low overall circuit resistance and drawing substantial current flow through heater 60, causing it to produce a comparatively high level of heat. This has the effect of shifting the set-point of thermostat 34 downwardly, since the thermostat in effect calls for cooling under ambient air temperature conditions lower than the sum of true ambient (or a selected other temperature) plus the additional heat from heater 60. In this connection, it has been found that production of about two and one-half watts by resistor 60 will change the set-point of a typical thermostat of the type used in room air conditioners about two degrees. Under these circumstances, a large voltage drop exists across heater 60 and only a minimal voltage drop occurs across LED 90 (particularly under the half-wave conditions present in the circuit configuration illustrated), and, as a result, no signal light is emitted by this LED.

On the other hand, in the presence of reduced ambient activity level, as evidenced by decreased light impingement upon the photocell 48, the latter exhibits a significantly increased internal resistance, resulting in commensurately increased voltage drop across it. As a result, the potential of junction point 82 falls below the trigger point of SCR 78, which thus goes into non-conduction, opening up circuit branch 66. When this occurs, the effective current flow through heater 60 is substantially decreased and as a result this component no longer produces sufficient heat to change the actual set-point of thermostat 34. As a result, the effective thermostat set-point is increased, allowing ambient temperatures to increase commensurately during periods of low-level activity (which may if desired simply be the relatively low level of illumination existing at night). Under these circumstances, the reduced current flow through heater 60 decreases the voltage drop across it and, as a result, the voltage drop across LED 90 is increased to the point where it begins to emit illumination, signalling that a set-point change is being commenced or has in fact occurred, with attendant change in environmental parameters (e.g., air temperature).

As will be understood upon reflection, the basic operation of control circuit 54 will be, or may readily be made, essentially the same with different forms of activity sensor 70 such as those noted above, where activity-indicative paramenters other than ambient light level are used. Of course, other specific forms of circuitry or apparatus for shifting thermostat set-point may also be utilized, in accordance with the broader aspects of the invention, by using the same underlying concept and basic approach as that described above. For example, the sensor could be integrated into a completely electronic control, and a microprocessor could be utilized, where the control functions are implemented in hardware or software algorithms and an electronic thermostat and light sensor could also be used, to obtain an extensive and precise range of control, including proportional changes in environment in response to degrees of change in activity level.

In the foregoing connection, however, it is to be noted that the use of a set-point-varying component such as resistive heater 60 makes a valuable contribution to the overall system operation in addition to its basic set point-changing function, in that its heat-producing operation, and the effect of that heat upon the thermostat, occurs over a definite period of lag or hysteresis. Thus, momentary or short-duration periods of decreased activity sensed by the photocell or other such component 70 will have no instantaneous or large-scale effect upon the overall cooling operation of the air conditioner unit 10. Accordingly, it will be seen that in the disclosed preferred embodiment, control circuit 54 inherently incorporates means providing for a lengthened response time constant which, in the overall operation of the air conditioning system, is analogous to the function of an integrater for the signal produced by the sensor 70. Of course, circuit time constants may be set by other components as well, even to the extent of using variable R-C networks, as influenced by the particular set point-shifting means employed.

Other particular implementation aspects of the apparatus disclosed above, and variations thereof, should also be noted. For example, the signalling LED 90 may desirably be mounted directly within the lenses 44, 46 at the center of either such lens and directed outwardly, or this component may be mounted at the center of the light-accepting input to photocell 49, in a shielded configuration to avoid optical coupling with the photocell. The latter approach contributes to a modular implementation of the entire apparatus, which is preferred, in which event the lenses 44, 46 would preferably be mounted on the circuit board and the door 28 adapted to incorporate a window or aperture aligned with the lenses. Such a module may be readily mounted in the position shown in FIG. 3 by use of a snap front clip, etc., and the same is true of the heater 60, which as indicated may be clipped in place upon a conventional thermostat.

Accordingly, it will be understood by those skilled in the art that the preferred embodiment specifically illustrated and described above is merely illustrative of the underlying invention, and that various changes, alterations and variations may be made without departing from the underlying concept and broader aspects of the invention, toward which the appended claims are directed. Therefor, the ensuing claims should be construed in accordance with the underlying spirit of the invention and in light of its broader aspects, in accordance with the established principals of patent law, including the Doctrine of Equivalents.

The embodiments of the invention in which an exclusive property or privilege is claimed are defined as follows.

1. In an air-conditioning system, of the type having means for providing temperature-conditioned air to an interior area, an adjustable temperature-responsive control means connected in a circuit to actuate said air-providing means on sensing of a predetermined air temperature level set-point within said area, means for changing the set-point of said control means, and light-sensing means coupled to said set-point-changing means for automatically modifying the set-point on sensing of a predetermined change in ambient light representing a change in the activity level within said area, the improvement wherein said light-sensing means includes a light-activated control element together with lens means for collecting said ambient light and applying it to said control element in a manner augmenting its response to said ambient light, and said means for providing temperature-conditioned air has a control panel disposed in recessed position behind a movable access door and a plurality of operating controls including said light-activated control element mounted upon said control panel behind said door; said door having substantially reduced light-transmissivity and generally acting to shade said control element but including a port disposed in alignment with said control element to pass ambient light thereto from in front of said door; said lens means being disposed in mutual alignment with said port and said control element to collect such light and apply it to said control element, to thereby enable operation of said control element despite its recessed and generally shaded location.

2. The improvement for air-conditioning systems as recited in claim 1, wherein said lens means includes a lens element mounted on said access door for movement therewith.

3. The improvement for air-conditioning systems as recited in claim 2, wherein said lens element has a convex surface on its side closest said area.

4. The improvement for air-conditioning systems as recited in claim 2, where said lens means includes a pair of lens elements disposed one behind the other, at least a first such lens element being mounted on said access door and arranged to apply received light onto a second such lens element.

5. The improvement for air-conditioning systems as recited in claim 4, wherein said second lens element is mounted at the light-admitting end of said light-activated control element and supported with said element by said control panel.

* * * * *